Patented Oct. 12, 1954

2,691,685

UNITED STATES PATENT OFFICE 2,691,685

PROCESS FOR MAKING ACETALS

Ludo K. Frevel and John William Hedelund, Midland, Mich., assignors to The Dow Chemical Company, Midland, Mich., a corporation of Delaware No Drawing. Application March 1, 1950,
Serial No. 147,135

7 Claims. (Cl. 260—615)

This invention concerns an improved process for making an acetal by reaction of acetaldehyde or its homologue with a primary or a secondary monohydric alcohol containing from 2 to 4 carbon atoms in the molecule. It relates more particularly to procedure for carrying out the reaction in vapor phase in the absence of a catalyst.

It is known to prepare acetals by reacting a monohydric alcohol such as ethyl alcohol, isopropyl alcohol or normal butyl alcohol, with acetaldehyde in liquid phase in the presence of a catalytic amount of hydrochloric acid or in the presence of an inorganic salt, e. g. calcium chloride or calcium nitrate, as condensing agent.

The methods heretofore proposed for the production of an acetal by reacting a monohydric alcohol with an aldehyde in liquid phase have not been entirely satisfactory for production of an acetal on a commercial scale, particularly with regard to the rate at which the reaction proceeds.

It is an object of the invention to provide a process for reacting in vapor phase, acetaldehyde, or propionaldehyde, and a monohydric lower alkyl alcohol containing from 2 to 4 carbon atoms in the molecule to form a corresponding acetal. Another object is to react in vapor phase a primary or a secondary monohydric alkyl alcohol containing from 2 to 4 carbon atoms in the molecule and acetaldehyde or propionaldehyde to form a corresponding acetal in the absence of a catalyst. Other and related objects will become apparent from the following description of the invention.

According to the invention, acetaldehyde or propionaldehyde can readily be reacted with a primary or a secondary monohydric alkyl alcohol containing from 2 to 4 carbon atoms in the molecule to form a corresponding acetal in good yield in the absence of a catalyst by passing acetaldehyde, or propionaldehyde, and the alcohol through a reaction zone wherein vapors of the aldehyde and the alcohol in admixture with each other are heated to a reaction temperature of not more than 600° C., cooling the effluent vapors to condense liquid product and separating the acetal from the condensed liquor.

As the alcohol starting material any primary or secondary monohydric alkyl alcohol containing from 2 to 4 carbon atoms in the molecule may be used. Examples of suitable alcohols are ethyl alcohol, normal propyl alcohol, isopropyl alcohol, normal butyl alcohol, sec.-butyl alcohol, and isobutyl alcohol.

The reactants, i. e. the aldehyde and the alcohol are preferably employed in anhydrous, or substantially anhydrous, condition, although the reaction may be carried out in the presence of appreciable amounts, e. g. 30 per cent by weight or less, of water vapor, or steam, based on the combined weight of the reactants.

The alcohol and the acetaldehyde, or propionaldehyde, may be used in any desired proportions, but for reasons of economy, it is preferred to employ the reactants in approximately stoichiometric proportions, i. e. in amounts corresponding to approximately two molecular proportions of the monohydric alkyl alcohol per molecular equivalent proportion of acetaldehyde, or propionaldehyde.

The reaction may be carried out at atmospheric, subatmospheric, or superatmospheric pressure, but is preferably carried out at atmospheric pressure, or slightly above, e. g. at pressures of from 2 to 50 pounds per square inch gauge, and in the substantial absence of air, or oxygen. The reaction is usually carried out by passing a mixture of the vapors of the alcohol and the aldehyde through a heated tube, or other suitable reaction vessel, preferably constructed of non-metallic material such as glass, quartz, graphite, ceramic, or glass enameled steel, in the presence or absence of steam, or an inert gas such as nitrogen, or helium, as a diluent, or sweep gas, to provide a positive flow of vapor through the reaction zone. Such diluent gases usually provide more uniform distribution of heat throughout the reaction and reduce the tendency toward decomposition of the reactants, or the products.

The reaction time, i. e. the time of heating the vapors at a reaction temperature, to obtain the maximum yield of acetal will vary depending upon the aliphatic aldehyde and the alcohol employed in the reaction. The vapors should not be heated at a reaction temperature for a time such as to cause excessive decomposition of the reactants, or products. The reaction time can readily be controlled by regulating the flow of the reactant vapors to the reaction zone. In general, satisfactory results are obtained by heating the mixture of vapors to a reaction temperature not greater than 600° C., preferably to a reaction temperature between 200° C. and 500° C. for a contact time of from 0.1 to 10 seconds.

The acetaldehyde, or propionaldehyde, and the monohydric alkyl alcohol, i. e. the reactants, may be fed separately into admixture with each other in a preheater, or vaporizer, maintained at a temperature above the boiling point of the reactants to rapidly vaporize the same, or the reactants may be mixed together in the desired proportions and the mixture rapidly vaporized by feeding the same into a vaporizing chamber. Such vaporizing chamber may conveniently be an adjacent portion of the reaction vessel, e. g. one end of a heated tube, so that the vapors are quickly heated to a reaction temperature. In practice, the aliphatic aldehyde and the alcohol are preferably mixed together in the desired proportions and the mixture is vaporized by feeding the same into a preheater, or vaporizer, maintained at a temperature sufficiently above the boiling point of the reactants to rapidly vaporize the same. The mixture of vapors is immediately passed through a heated zone wherein the vapors are heated to a reaction temperature of not more than 600° C., for a contact time of from 0.1 to 10 seconds to cause a reaction between the saturated aliphatic aldehyde and the monohydric alcohol and form the corresponding acetal. The effluent reaction vapors are cooled to condense the liquid product, i. e. the acetal together with water formed in the reaction and any unreacted aldehyde and alcohol, and separate it from the permanently gaseous components such as hydrogen, or carbon monoxide, which may also be formed in the reaction, or from inert gas, e. g. nitrogen, which may be used as a sweep gas in the process. The condensed liquor is fractionally distilled to recover the acetal product and separate it from the lower boiling ingredients, e. g. the unreacted aldehyde and alcohol, and the higher boiling residue. The aldehyde and the alcohol thus recovered may be reused in the process.

The following examples illustrate practice of the invention, but are not to be construed as limiting the scope thereof.

*Example 1*

A solution consisting of 200 grams of 95 per cent ethyl alcohol and 196 grams (4.4 moles) of acetaldehyde was fed at an average rate of about 3.9 cc. of the solution per minute into one end of a heated quartz tube 60 centimeters long having an internal diameter of 4 centimeters, packed with ¼ inch ceramic saddles to form a bed 48 centimeters deep. The solution was immediately vaporized and the gaseous mixture heated to a temperature of 350° C. for a contact time of about 6 seconds during passage through the bed. By contact time is meant the time required for flow through the bed of an infinitesimal portion of the vapor mixture. The effluent vapors were cooled to condense liquid product. There was obtained 383 grams of liquid condensate. It was analyzed and found to contain 221 grams of acetal, the remainder being unreacted acetaldehyde and ethyl alcohol, together with water. This corresponds to a yield of acetal of 58.8 per cent based on the combined weight of the ethyl alcohol and acetaldehyde starting materials.

*Example 2*

A solution consisting of 178 grams (3.8 moles) of anhydrous ethyl alcohol and 65 grams (1.5 moles) of acetaldehyde was fed at a rate of 4 cc. of the solution per minute into one end of a heated glass tube 94 centimeters long having an internal diameter of 2.54 centimeters. The tube was packed with ¼ inch ceramic saddles to form a bed 60 centimeters deep, consisting of an upper preheating zone 28 centimeters long and a lower reaction zone 32 centimeters long. The solution was rapidly vaporized in the preheating zone and the vapors were immediately heated to a reaction temperature of 200° C. for a contact time of about 1.7 seconds during passage through the reaction zone. By contact time is meant the time required for flow through the reaction zone of an infinitesimal portion of the vapor mixture. The effluent vapor was cooled to condense liquid product. There was obtained 185 grams of liquid condensate. It was analyzed and found to consist of 8.9 per cent by weight of acetaldehyde, 16.8 per cent of ethyl alcohol, 10.2 per cent of water and 64.1 per cent of acetal. This corresponds to a yield of acetal of 62.5 per cent, based on the combined weight of the acetaldehyde and ethyl alcohol starting materials.

*Example 3*

A solution consisting of 273 grams (5.9 moles) of absolute ethyl alcohol and 122 grams (2.8 moles) of acetaldehyde was fed at an average rate of about 6 cc. of the solution per minute into one end of the heated tube described in Example 2. The solution was rapidly vaporized in the preheating zone and the mixture of vapors was immediately heated to a temperature of 500° C. for a contact time of about 0.9 second during passage through the reaction zone. The effluent vapor was cooled to condense liquid product. There was obtained 382.5 grams of liquid condensate. An amount of the condensate weighing 208 grams was dried by shaking with granular anhydrous calcium chloride and the organic liquid separated by filtering. There was obtained 128 grams of liquid. It was fractionally distilled and found to consist of 99.5 grams of acetal, together with 28.5 grams of lower boiling ingredients. The yield of acetal was 46.4 per cent, based on the combined weight of the acetaldehyde and ethyl alcohol starting materials.

*Example 4*

A solution consisting of 145 grams (1.98 moles) of normal butyl alcohol and 43 grams (0.98 mole) of acetaldehyde was fed at a rate of about 5 cc. of the solution per minute into the reactor described in Example 2. The solution was immediately vaporized and the mixture of vapors heated to a temperature of 450° C. for a contact time of about 1.5 seconds during passage through the reaction zone. The effluent vapor was cooled to condense liquid product. There was obtained 185 grams of liquid condensate. It was analyzed and found to consist of 33 grams of acetaldehyde, 111 grams of normal butyl alcohol, 4 grams of water and 37 grams of di-normal-butyl acetal of acetaldehyde. The acetal corresponds to a yield of 19.7 per cent based on the combined weight of the acetaldehyde and normal butyl alcohol starting materials, or 91.5 per cent of theoretical, based on the acetaldehyde consumed in the reaction.

*Example 5*

A solution consisting of 119 grams (1.98 moles) of normal propyl alcohol and 58 grams (1 mole) of propionaldehyde was fed at a rate of 4 cc. of the solution per minute into the heated tube described in Example 2. The solution was immediately vaporized and the mixture of vapors heated to a temperature of 500° C. for a contact time of about 0.9 second during passage through the reaction zone. The effluent vapors were cooled to condense liquid product. There was obtained 169 grams of liquid condensate. It was analyzed and found to contain 51 grams of di-propyl acetal of propionaldehyde, the remainder being propionaldehyde, propyl alcohol and water. The acetal product corresponds to a yield of 13 per cent based on the combined weight of the propionaldehyde and normal propyl alcohol starting materials.

*Example 6*

By procedure similar to that described in Example 2, a solution consisting of 146 grams (1.99 moles) of normal butyl alcohol and 58 grams (1 mole) of propionaldehyde was fed at a rate of 4.5 cc. of the solution per minute into the heated glass tube described in Example 2 and vaporized in the preheating zone. The vapor was heated to a reaction temperature of 455° C. for a contact time of about 2 seconds during passage through the reaction zone. The effluent vapor was cooled to condense liquid product. There was obtained 201 grams of liquid condensate. It was analyzed and found to consist of 42 grams of propionaldehyde, 105 grams of normal butyl alcohol, 5 grams of water and 49 grams of dibutyl acetal of propionaldehyde. This corresponds to a yield of acetal product of 24 per cent based on the combined weight of the propionaldehyde and the normal butyl alcohol starting material.

Other modes of applying the principle of the invention may be employed instead of those explained, change being made as regards the method or products herein disclosed, provided the steps or products stated by any of the following claims or the equivalent of such stated steps or products be employed.

We claim:

1. A method for making an acetal which comprises passing a saturated aliphatic aldehyde containing from 2 to 3 carbon atoms in the molecule and a monohydric alkyl alcohol selected from the class consisting of primary and secondary monohydric alkyl alcohols containing from 2 to 4 carbon atoms in the molecule through a heated zone wherein vapors of the aldehyde and the alcohol in admixture with each other are heated to a reaction temperature of from 200° to 600° C. in the absence of a catalyst for a contact time of from 0.1 to 10 seconds, cooling the effluent vapor to condense liquid product and separating the acetal from the condensed liquid.

2. A process for making an acetal which comprises passing propionaldehyde and a primary monohydric alkyl alcohol containing from 2 to 4 carbon atoms in the molecule through a heated zone wherein vapors of the propionaldehyde and the alcohol in admixture with each other are heated to a reaction temperature of from 200° to 600° C. in the absence of a catalyst for a contact time of from 0.1 to 10 seconds, cooling the effluent vapor to condense liquid product and separating the acetal from the condensed liquid.

3. A process as claimed in claim 2 wherein the alcohol is normal propyl alcohol.

4. A process as claimed in claim 2 wherein the alcohol is normal butyl alcohol.

5. A method for making an acetal which comprises passing acetaldehyde and a primary monohydric alkyl alcohol containing from 2 to 4 carbon atoms in the molecule through a heated zone wherein vapors of the acetaldehyde and the alcohol in admixture with each other are heated to a reaction temperature between 200° and 500° C. in the absence of a catalyst for a contact time of from 0.1 to 10 seconds, cooling the effluent vapor to condense liquid product and separating the acetal from the condensed liquid.

6. A process as claimed in claim 5 wherein the alcohol is ethyl alcohol.

7. A process as claimed in claim 5 wherein the alcohol is normal butyl alcohol.

References Cited in the file of this patent

UNITED STATES PATENTS

| Number | Name | Date |
|---|---|---|
| 1,312,186 | King et al. | Aug. 5, 1919 |
| 1,850,836 | Guinot | Mar. 22, 1932 |
| 2,337,059 | Mikeska et al. | Dec. 21, 1943 |
| 2,350,350 | Gresham | June 6, 1944 |
| 2,451,949 | Heinemann | Oct. 19, 1948 |
| 2,508,257 | Hearne et al. | May 16, 1950 |
| 2,578,724 | Mertzweiller | Dec. 18, 1951 |

OTHER REFERENCES

Hackh: Chemical Dictionary, third edition, pp. 377–8, 705–6 and 769–7 (1944), Blakiston Co., Phila.